(12) United States Patent
Han (10) Patent No.: US 11,904,758 B2
(45) Date of Patent: Feb. 20, 2024

(54) VARIABLE BEAM PATTERN LAMP SYSTEM FOR DRIVER AND CONTROL METHOD THEREOF

(71) Applicant: HYUNDAI MOBIS CO., LTD., Seoul (KR)

(72) Inventor: Seong Yeon Han, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 362 days.

(21) Appl. No.: 17/101,462

(22) Filed: Nov. 23, 2020

(65) Prior Publication Data

US 2021/0162914 A1 Jun. 3, 2021

(30) Foreign Application Priority Data

Dec. 3, 2019 (KR) ........................ 10-2019-0159271

(51) Int. Cl.
*B60Q 1/08* (2006.01)
*B60Q 1/16* (2006.01)
(Continued)

(52) U.S. Cl.
CPC ........... *B60Q 1/085* (2013.01); *B60Q 1/1423* (2013.01); *B60Q 1/16* (2013.01); *B60Q 3/80* (2017.02); *B60W 40/08* (2013.01); *B60Q 2300/20* (2013.01); *B60Q 2300/23* (2013.01); *B60Q 2300/31* (2013.01); *B60Q 2300/312* (2013.01);
(Continued)

(58) Field of Classification Search
CPC ...... B60Q 1/085; B60Q 1/1423; B60Q 1/143; B60Q 2300/20; B60Q 2300/23
See application file for complete search history.

(56) References Cited

U.S. PATENT DOCUMENTS 7,639,149 B2 12/2009 Katoh
10,576,993 B2 3/2020 Yoon
(Continued)

FOREIGN PATENT DOCUMENTS

CN 105905116 A 8/2016
CN 108506885 A 9/2018
(Continued)

OTHER PUBLICATIONS

Office Action dated Jul. 11, 2023, in Chinese Patent Application No. 2020113841782.

*Primary Examiner* — William N Harris
(74) *Attorney, Agent, or Firm* — H.C. Park & Associates, PLC (57) ABSTRACT

A variable beam pattern lamp system for a driver provides an input device that receives personal information of the driver, a lamp driving device that drives an indoor or outdoor lamp of a vehicle to output a beam pattern matched to the driver, based on the personal information of the driver, the personal information being input through the input device, and a vehicle controller that determines whether the personal information is registered driver information or unregistered driver information, when the personal information of the driver is input through the input device, and controls the lamp driving device to drive the indoor or outdoor lamp of the vehicle using beam patterns respectively corresponding to that the personal information is the registered driver information and that the personal information is the unregistered driver information.

15 Claims, 4 Drawing Sheets

(51) Int. Cl.
  *B60W 40/08*   (2012.01)
  *B60Q 3/80*   (2017.01)
  *B60Q 1/14*   (2006.01)
(52) U.S. Cl.
  CPC .... *B60Q 2300/314* (2013.01); *B60Q 2300/45* (2013.01)

(56) References Cited

U.S. PATENT DOCUMENTS

| | | | | |
|---|---|---|---|---|
| 2007/0273492 A1* | 11/2007 | Hara | ............... | B60W 50/06 340/438 |
| 2014/0049973 A1* | 2/2014 | Adachi | ............... | B60Q 11/00 362/465 |
| 2018/0245761 A1* | 8/2018 | Tsuji | ............... | F21S 41/143 |
| 2019/0031085 A1* | 1/2019 | Ba | ............... | B60Q 1/085 |
| 2019/0047497 A1* | 2/2019 | Sham | ............... | G06V 20/56 |

FOREIGN PATENT DOCUMENTS

| | | |
|---|---|---|
| CN | 109910738 A | 6/2019 |
| JP | 4462231 | 5/2010 |
| KR | 10-0835788 | 6/2008 |
| KR | 10-1385553 | 4/2014 |

\* cited by examiner

SELECT USM (USER SETTING MODE)

Lights and Lighting
Exterior Lights

Active High Beam Timing
Actives automatic on/off High Beam

| Slow | Normal | Fast |

Home Safety Light Time
illuminate home exterior lights when leaving car

| 30 sec | 60 sec | 90 sec |

Welcome Light
Activates some exterior lights when unlocking car

Triple Flash Turn Indicator
Flashes three times when activated

Automatic Trailer Lamp Check
Auto switch on trailer lamps and chock manually

EXAMPLE OF PROVIDING OPTION

| AUTO (RECOMMENDED, DEFAULT) | Low (ENERGY SAVING) | Normal (ENERGY NORMAL) | High (ENERGY RAISING) |

Fig.3

Fig.4

VARIABLE BEAM PATTERN LAMP SYSTEM FOR DRIVER AND CONTROL METHOD THEREOF

CROSS-REFERENCE TO RELATED APPLICATION

This application claims priority from and the benefit of Korean Patent Application No. 10-2019-0159271, filed on Dec. 3, 2019, which is hereby incorporated by reference for all purposes as if set forth herein.

BACKGROUND

Field

Exemplary embodiments relate to a variable beam pattern lamp system for a driver and a control method thereof, and more particularly, relates to a variable beam pattern lamp system for a driver to obtain identifiable personal information of the driver and actively provide a beam pattern suitable for the driver and a control method thereof.

Discussion of the Background

In general, light devices are provided in a vehicle to safely ensure the visibility of a driver when surrounding illumination is low while driving. A light emitting diode (LED) head lamp, which uses an LED as a light source of a head lamp, among the light devices has been developed.

Herein, the LED is a diode which emits excess energy as light, when injected electrons and holes are recombined, which includes a red LED, a green LED, and the like and is mainly used as a light source by taking advantage of low voltage or small power.

Particularly, an LED array is a kind of light source formed by mounting a plurality of LEDs, which is possible to directly implement various beam patterns by selectively turning on a plurality of LEDs.

Thus, the LED array may be effectively used to implement various beam patterns by being applied to a head lamp and a rear lamp of the vehicle.

However, because a conventional LED head lamp provides only a fixed beam pattern lamp function, such as low, high, rear, and signal functions, it is difficult to change a current beam pattern to a beam pattern suitable for the driver and there is a limitation in providing a beam pattern suitable for a situation.

The above information disclosed in this Background section is only for enhancement of understanding of the background of the invention and, therefore, it may contain information that does not constitute prior art.

SUMMARY

An aspect of the inventive concepts provides a variable beam pattern lamp system for a driver to obtain identifiable personal information of a driver and actively provide a beam pattern suitable for the driver, which improves safety by distinguishing a registered user who uses his or her own vehicle from an unspecified unregistered user who does not want to open his or her personal information and providing an optimal pattern in which user information such as an age, a gender, a fatigue level, or a mood state of the driver, is reflected and improves marketability and convenience by obtaining real-time information of the driver and controlling a beam pattern suitable for a situation, and a method thereof.

The technical problems to be solved by the inventive concept are not limited to the aforementioned problems, and any other technical problems not mentioned herein will be clearly understood from the following description by those skilled in the art to which the inventive concepts pertains.

According to an aspect of the inventive concepts, a variable beam pattern lamp system for a driver may include an input device that receives personal information of the driver, a lamp driving device that drives an indoor or outdoor lamp of a vehicle to output a beam pattern matched to the driver, based on the personal information of the driver, the personal information being input through the input device, and a vehicle controller that determines whether the personal information is registered driver information or unregistered driver information, when the personal information of the driver is input through the input device, and controls the lamp driving device to drive the indoor or outdoor lamp of the vehicle to output beam patterns respectively corresponding to that the personal information is the registered driver information and that the personal information is the unregistered driver information.

In an embodiment, the input device may include an image capture device that captures an image of a face of the driver and a fingerprint sensing device that obtains fingerprint information of the driver.

In an embodiment, the input device may further include a wireless communication device configured to receive information of a wireless device of the driver.

In an embodiment, the input device may further include a weather sensing device configured to collect weather information.

In an embodiment, the input device may further include a selection input device configured to receive a selection of a beam pattern of the indoor or outdoor lamp of the vehicle from the driver.

In an embodiment, the beam pattern matched to the driver may be differently provided according to an age, a gender, a fatigue level, or a mood state of the driver.

In an embodiment, the beam pattern matched to the driver may be differently provided based on a brightness, a color temperature, or a short or long range of light.

In an embodiment, the vehicle controller may determine whether the personal information of the driver is driver information stored in an external server, when the personal information of the driver, the personal information being input through the input device, is the is unregistered driver information.

According to another aspect of the inventive concepts, a method for controlling a variable beam pattern lamp for a driver may include receiving, by an input device, personal information of the driver, determining, by a vehicle controller, whether the personal information is registered driver information or unregistered driver information, when the personal information of the driver is input through the input device, and controlling, by the vehicle controller, a lamp driving device to drive an indoor or outdoor lamp of a vehicle to output beam patterns respectively corresponding to that the personal information is the registered driver information and that the personal information is the unregistered driver information, and driving, by the lamp driving device being controlled by the vehicle controller, the indoor or outdoor lamp of the vehicle to output a beam pattern matched to the driver.

In an embodiment, the receiving of the personal information of the driver may include capturing, by an image capture device, an image of a face of the driver or obtaining, by a fingerprint sensing device, fingerprint information of the driver.

In an embodiment, the receiving of the personal information of the driver may further include receiving, by a wireless communication device, information of a wireless device of the driver.

In an embodiment, the receiving of the personal information of the driver may further include collecting, by a weather sensing device, weather information.

In an embodiment, the receiving of the personal information of the driver may is further include receiving, by a selection input device, a selection of a beam pattern of the indoor or outdoor lamp of the vehicle.

In an embodiment, the determining whether the personal information is the registered driver information or the unregistered driver information may include determining, by the vehicle controller, whether the personal information of the driver is driver information stored in an external server, when the personal information of the driver, the personal information being input through the input device, is the unregistered driver information.

In an embodiment, the driving of the indoor or outdoor lamp of the vehicle may include differently providing the beam pattern matched to the driver depending on an age, a gender, a fatigue level, or a mood state of the driver.

In an embodiment, the driving of the indoor or outdoor lamp of the vehicle may include differently providing the beam pattern matched to the driver depending on a brightness, a color temperature, or a short or long range of light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are illustrated. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinafter, some embodiments of the inventive concepts will be described in detail with reference to the exemplary drawings. In adding the reference numerals to the components of each drawing, it should be noted that the identical or equivalent component is designated by the identical numeral even when they are displayed on other drawings. Further, in describing the embodiment of the inventive concepts, a detailed description of well-known features or functions will be ruled out in order not to unnecessarily obscure the gist of the inventive concepts.

In describing the components of the embodiment according to the inventive concepts, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the inventive concepts pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the inventive concepts will be described in detail with reference to FIGS. 1 to 3.

Figure 1:
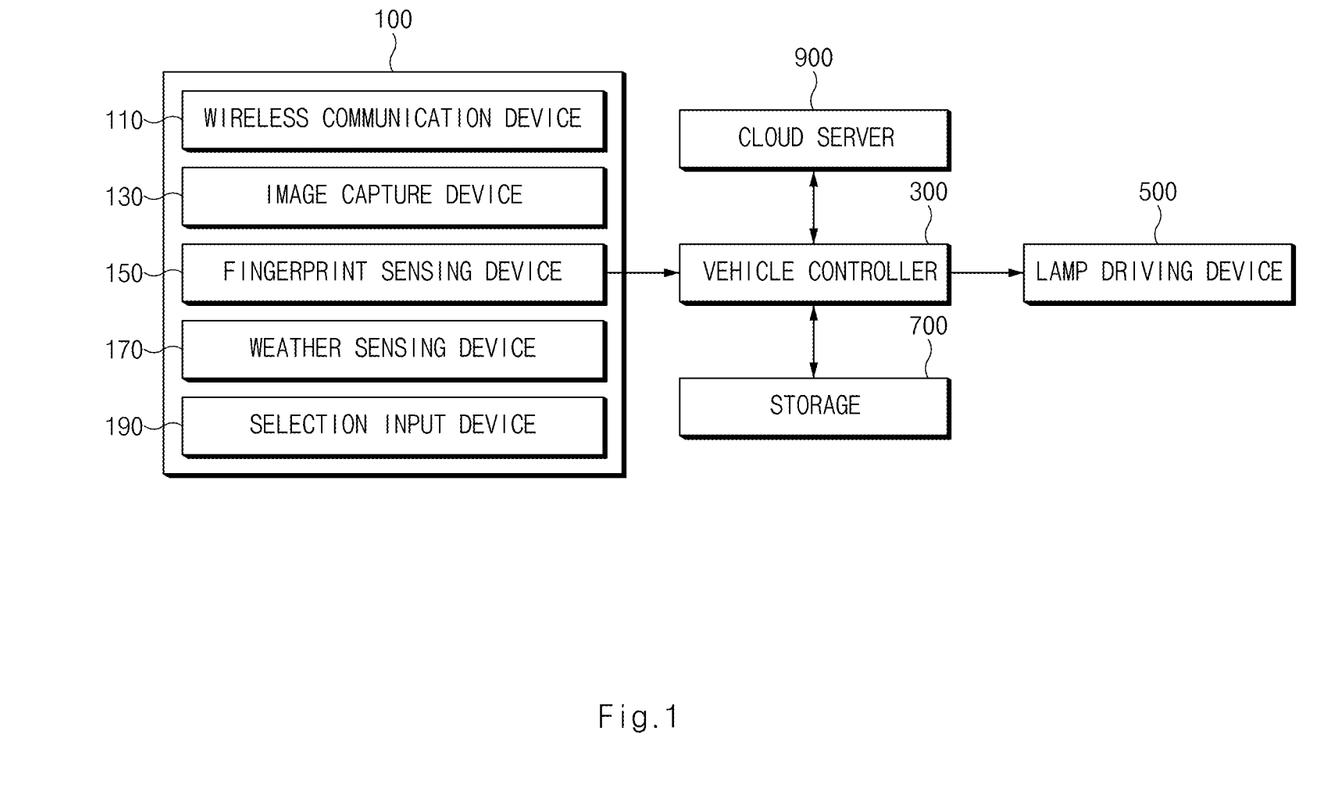
FIG. 1 is a block diagram illustrating a variable beam pattern lamp system for a driver according to an embodiment of the inventive concepts.
Figure 2:
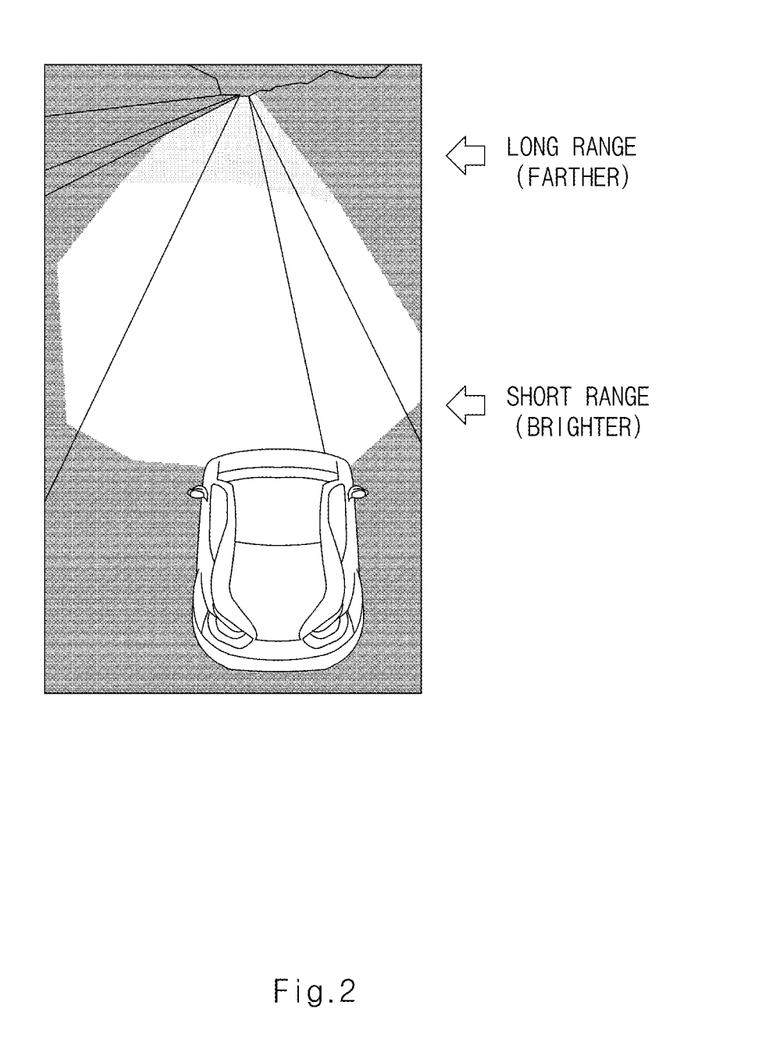
FIG. 2 is a drawing illustrating a beam pattern output by a variable beam pattern lamp system for a driver according to an embodiment of the inventive concepts.

FIG. 1 is a block diagram illustrating a variable beam pattern lamp system for a driver according to an embodiment of the inventive concepts. FIG. 2 is a drawing illustrating a beam pattern output by a variable beam pattern lamp system for a driver according to an embodiment of the inventive concepts. FIG. 3 is a drawing illustrating a selection input in a variable beam pattern lamp system for a driver according to an embodiment of the inventive concepts.

Referring to FIG. 1, the variable beam pattern lamp system for the driver according to an embodiment of the inventive concepts may be configured to include an input device 100, a vehicle controller 300, a lamp driving device 500, and a storage unit 700.

The input device 100 may be configured to include a wireless communication device 110, an image capture device 130, a fingerprint sensing device 150, a weather sensing device 170, and a selection input device 190.

The wireless communication device 110 may receive information of a wireless device, such as a smartphone or a smart watch, of the driver. When the driver approaches a vehicle to ride in the vehicle, the wireless communication device 110 may perform short-range communication with the smartphone or the smart watch to recognize the approaching of the driver. The wireless communication device 110 may include a long term evolution (LTE) mode, a fifth generation (5G) mode, a Bluetooth mode, a wireless-fidelity (Wi-Fi) mode, or the like.

The wireless communication device 110 may deliver a driver recognition notification to the vehicle controller 300. The vehicle controller 300 may control the lamp driving device 500 to turn on a welcome lamp before the driver rides in the vehicle to welcome the driver.

The image capture device 130 and the fingerprint sensing device 150 may receive personal information of the driver. The image capture device 130 may capture an image of the driver to perform face recognition and/or iris recognition, after the driver sits in the vehicle. The fingerprint sensing device 150 may obtain fingerprint information of the driver.

When the fingerprint information of the driver is input through the fingerprint sensing device 150, the vehicle controller 300 may determine whether the input fingerprint information is registered driver information or unregistered driver information, and may control the lamp driving device 500 to drive an indoor or outdoor lamp of the vehicle to output beam patterns respectively corresponding to the input fingerprint information being the registered driver information and that the input fingerprint information is the unregistered driver information.

When the driver is a registered driver such as the owner of the vehicle and inputs his or her fingerprint through the fingerprint sensing device 150, the vehicle controller 300 may fetch previously registered information from the storage 700 about the driver in relation to vehicle settings and provide the lamp driving device 500 with predetermined beam pattern information. The vehicle controller 300 may control the lamp driving device 500 such that the indoor or outdoor lamp of the vehicle outputs the predetermined beam pattern.

Subsequently, the vehicle controller 300 may identify a current state of the driver using biometric information of the driver, such as face recognition information or iris recognition information of the driver, by way of the image capture device 130 and may control the lamp driving device 500 such that the indoor or outdoor lamp of the vehicle outputs a beam pattern to suit the current state of the driver. Thus, although the indoor or outdoor lamp of the vehicle outputs the predetermined beam pattern by the registered driver, it may change and output the predetermined beam pattern to a beam pattern suitable for the current state of the driver, depending on the current state of the driver, which is identified using the biometric information of the driver, such as face recognition information or iris recognition information of the driver.

The lamp driving device 500 may drive the indoor or outdoor lamp of the vehicle to output a predetermined beam pattern to the driver under control of the vehicle controller 300, based on the personal information of the driver, which is input through the input device 100.

To output a beam pattern matched to the driver, the lamp driving device 500 may control the indoor or outdoor lamp of the vehicle to suit the current state of the driver in real time by obtaining body information, such as an age, a gender, a fatigue level, a mood state, or a drowsy state of the driver. As noted herein, when it is identified that the driver is in a drowsy state using face recognition and iris recognition, the lamp driving device 500 may control the indoor or outdoor lamp of the vehicle to deliver risk information according to drowsiness to the driver and a surrounding vehicle in the form of light.

For example, when it is identified that the driver is in a drowsy state, such as by a driver's eyelids being partially closed for a predetermined amount of time, the lamp driving device 500 may control all of indoor or outdoor lamps, such as a head lamp, a rear lamp, and an indoor lamp, in the vehicle to blink or to be turned on at an abnormal period, such that a surrounding vehicle recognizes the drowsiness of the driver, but embodiments are not limited thereto. Other examples of a drowsy or non-normal state could be a driver's head moving from side to side or falling forward more than a predetermined threshold, or the like. Indoor lamps could also include lights near a user's feet, either driver side or passenger side. Lights on the console or dashboard, speaker lights, all of which could include variable color or white light.

Alternatively, the lamp driving device 500 may provide a dangerous state of the driver using eyetracking information, which may identify whether the vehicle is normally traveling by obtaining information about a region of interest (ROI) where the view of the driver remains and may deliver information about a wrong driving habit of the driver in the form of light, when the vehicle is abnormally traveling. For example, when the driver sees a place unnecessary for driving for a long time, the lamp driving device 500 may control the outdoor lamp to blink several times towards the unnecessary place and may control the indoor lamp to blink several times, such that the driver recognizes the unnecessary place. The unnecessary place could be terrain that would be hazardous to drive for a certain period time at a given speed. The unnecessary place could be determined by GPS or other sensor information input to the vehicle that a road is coming to an end, or changing from a paved road to a dirt or gravel road, which could be hazardous or bumpy, for example.

By doing this, the lamp driving device 500 may notify a passenger and a surrounding vehicle as well as the driver of a risk signal in the form of light, thus preventing an accident from occurring due to drowsy driving or abnormal driving of the driver.

In addition, the older aged may have a narrower viewing angle than relatively younger persons. For example, when a general driver has a viewing angle of 120 degrees, the older aged may have a viewing angle of about 60 degrees. The older aged may have more of a decrease in eyesight than relatively younger persons, which may cause more decrease in recognition response time due to a decrease in behavioral cognition than the relatively younger persons. Thus, an older driver may fail to see a color of a specific wavelength band well. An older driver may be recognized by information provide from the driver's license of the driver or from facial recognition software that could recognize characteristics such as number of lines on a driver's face, which often is an indication of age, such as number of lines around a driver's eye area. Biometric information indicative of age such as grey hair could be also be recognized by the system as an indicator of age to trigger the system.

Thus, when the driver is recognized as the aged by obtaining body information, the lamp driving device 500 may control indoor and outdoor lamps of the vehicle to suit the aged. For example, referring to FIG. 2, the lamp driving device 500 may control a head lamp to raise the intensity of light of the head lamp to be generally bright closer to a vehicle, when a viewing angle of the driver is narrow, and may control the head lamp such that a short range is brighter when the vehicle is traveling at a low speed and may control the head lamp such that a long range is brighter when the vehicle is traveling at a high speed. These changes may reflect that a recognition response time decreases due to a deterioration in eyesight and a decrease in behavioral cognition. When the driver does not see a color of a specific wavelength band well, the lamp driving device 500 may control the head lamp to adjust a color temperature in a direction where visibility is advantageous, thus improving visibility. For reference, the aged may prefer a color temperature of a long wavelength band.

The vehicle controller 300 may control the indoor or outdoor lamp of the vehicle to output a beam pattern suitable for a current weather and a current time by way of the weather sensing device 170. The weather sensing device 170 may include sensors on a vehicle or include sensors configured receive weather or GPS data from weather or GPS satellites. The weather sensing device 170 may also receive weather data from other vehicles that are able to share weather and other data with the driver's vehicle.

For example, the vehicle controller 300 may control the indoor or outdoor lamp of the vehicle to output a similar beam pattern to the light of the sun at a current time, such as at sunset, in the middle of the night, or at sunrise. At sunset or sunrise, the vehicle controller 300 may control the indoor or outdoor lamp of the vehicle to output a beam pattern at a color temperature of 5000 K. In the middle of the night, the vehicle controller 300 may control the indoor or outdoor lamp of the vehicle to output a beam pattern at a color temperature of 5000 K to 6000 K.

When it is raining, when it is snowing, or when a heavy mist or fine dust occurs, the vehicle controller 300 may control the indoor or outdoor lamp of the vehicle to output a beam pattern suitable for a current weather.

In other words, when restriction occurs in passing light due to a medium such as rain, snow, mist, or dust, the vehicle controller 300 may control the indoor or outdoor lamp of the vehicle to output a beam pattern suitable for the restriction. Thus, the vehicle controller 300 may control the head lamp to be oriented towards a downward direction rather than an upward direction and to be oriented towards a short range rather than a long range. The vehicle controller 300 may reduce the intensity of light to decrease the amount of reflected light and may adjust a color temperature to perform adjustment which is less influenced by a medium, that is, change the light to long-wavelength light because it is easier to be reflected because there is light of a shorter wavelength.

Figure 3:
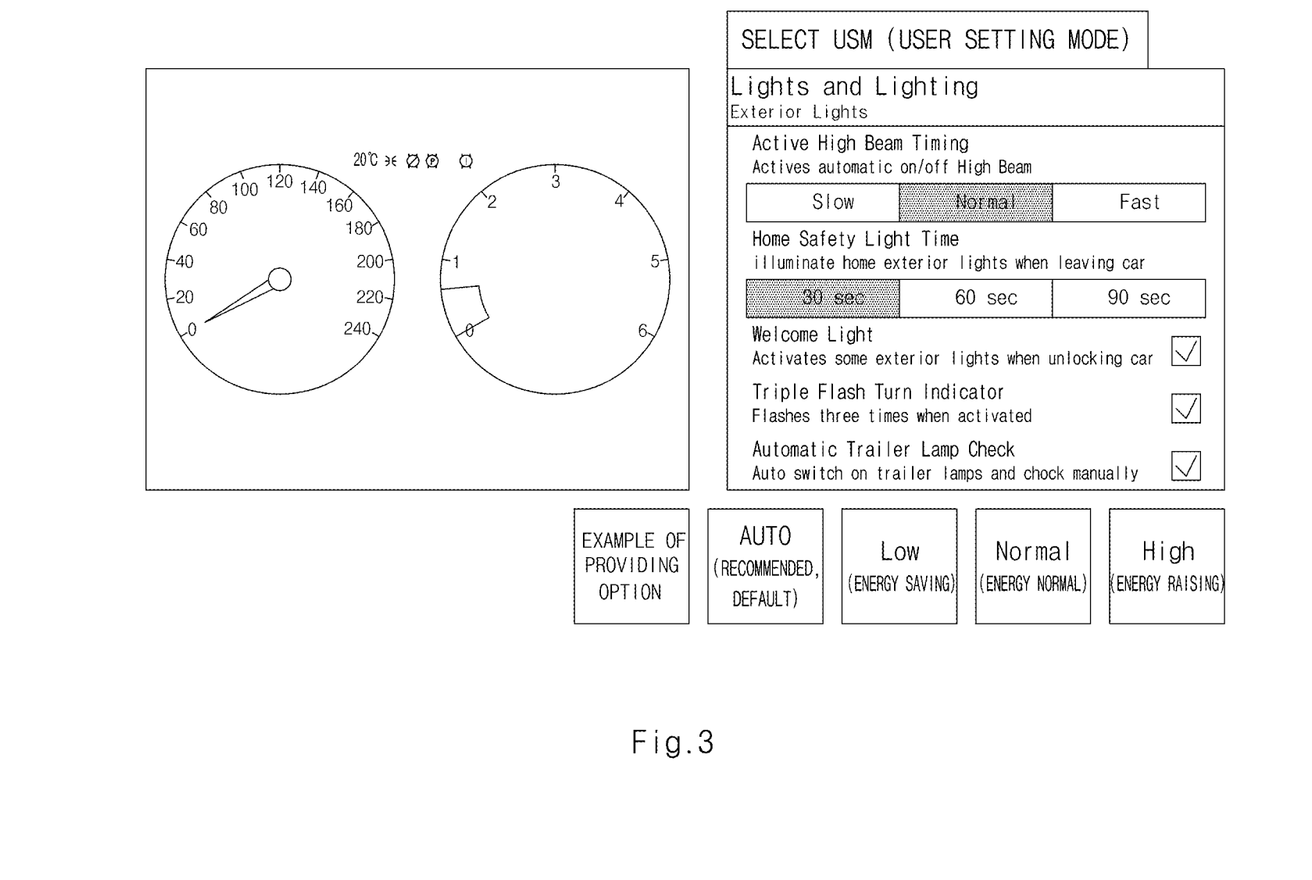
FIG. 3 is a drawing illustrating a selection input in a variable beam pattern lamp system for a driver according to an embodiment of the inventive concepts.

Referring to FIG. 3, the driver may directly select a beam pattern of an indoor or outdoor lamp of the vehicle by way of the selection input device 190. The selection method may be to select a beam pattern by providing a touch input to a touch screen or providing a voice recognition input. The input device 190 may provide an option such that the driver directly selects the beam pattern.

As an example of the option, auto selection of providing a beam pattern recommended based on the result learned using big data, a low button configured to provide a beam pattern that saves energy, a normal button configured to provide a beam pattern to consume normal energy, and a high button configured to provide a beam pattern using relatively much energy, or the like may be provided.

Meanwhile, when fingerprint information of the driver, which is input through the fingerprint sensing device 150, is unregistered driver information, the vehicle controller 300 may determine whether the fingerprint information of the driver is driver information registered with a cloud server 900. Thus, when the vehicle of the driver is a shared vehicle such as a car by car sharing or a rented car, although the driver is not the registered driver because the driver is not the owner of the vehicle, driver information may be previously registered with the cloud server 900 which manages shared vehicles. Thus, when the vehicle of the driver is a shared vehicle and when fingerprint information of the driver is input through the fingerprint sensing device 150, the vehicle controller 300 may request the cloud server 900 to determine whether the fingerprint information is driver information. When it is determined that there is the driver information in the cloud server 900, the vehicle controller 300 may receive the driver information and may control the lamp driving device 500 to output a predetermined beam pattern based on the driver information. Fingerprint information may be sensed on a steering wheel of a vehicle, may be sensed externally on a door handle or the like, may be sensed by a dedicated placement on the dashboard or console of the vehicle, though embodiments are not limited thereto. Embodiments may include other areas to receive fingerprints of a driver in accordance with the vehicle system described herein.

However, when the driver is not the registered driver because the driver is not the owner of the vehicle, when there is no driver information in the cloud server 900 when the vehicle is a shared vehicle, or when the driver does not agree with providing personal information, the vehicle controller 300 may perform iris recognition of the driver to obtain iris information and may change a beam pattern of the indoor or outdoor lamp of the vehicle according to age information.

In addition, the vehicle controller 300 may identify a current state of the driver using biometric information of the driver. The vehicle controller 300 may store results learned using artificial intelligence (AI) to use a record where the indoor or outdoor lamp of the vehicle outputs a beam pattern to suit the current state of the driver. The record may include where the indoor or outdoor lamp of the vehicle outputs a beam pattern to suit the current state of the driver in real time by obtaining body information of the driver. The record may be where the indoor or outdoor lamp of the vehicle is controlled to output a beam pattern suitable for a current weather and a current time by way of the weather sensing device 170. The record may also be a record where a beam pattern of the indoor or outdoor lamp of the vehicle is directly selected by way of the selection input device 190 as big data.

Subsequently, when the driving of the vehicle is completed and when the driver alights from the vehicle, the vehicle controller 300 may control the lamp driving device 500 to provide an escort lamp.

Figure 4:
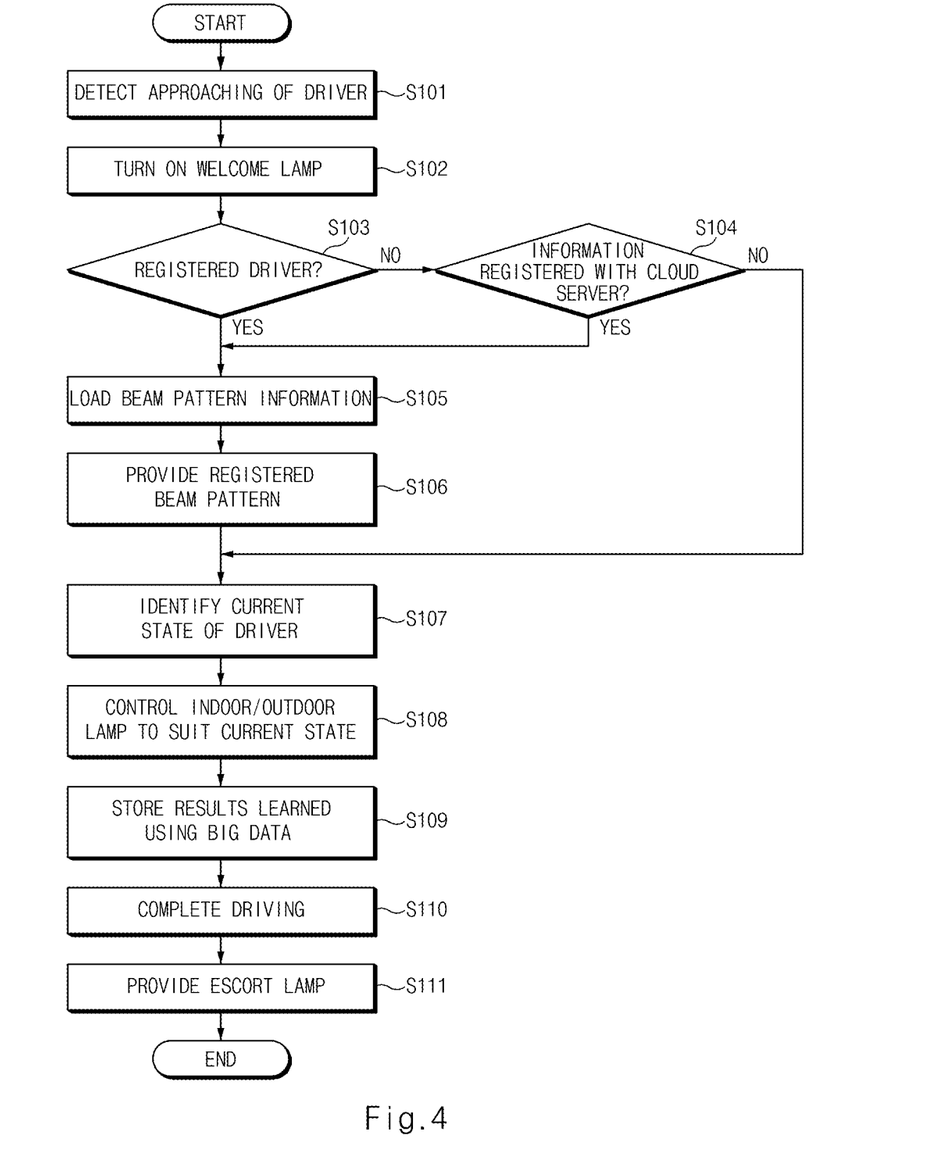
FIG. 4 is a flowchart illustrating a method for controlling a variable beam pattern lamp for a driver according to an embodiment of the inventive concepts.

Hereinafter, a method to control a variable beam pattern lamp for a driver according to another embodiment of the inventive concepts with reference to FIG. 4 is described. FIG. 4 is a flowchart illustrating a method for controlling a variable beam pattern lamp for a driver according to an embodiment of the inventive concepts.

Hereinafter, it is assumed that a variable beam pattern lamp system for a driver according to an embodiment of the inventive concepts of FIGS. 1 to 3 may be used to perform a process of FIG. 4.

When a wireless communication device 110 receives information of a wireless device, for example, a smartphone or a smart watch, of a driver and detects approaching of the driver in operations S101, in S102, a vehicle controller 300 may control a lamp driving device 500 to turn on a welcome lamp before the driver rides in the vehicle to welcome the driver. The welcome lamp could be a headlamp, inside light, outside light near the door of the driver, or the like.

When the driver is a registered driver such as the owner of the vehicle and inputs his or her fingerprint through a fingerprint sensing device 150 in operation S103, in operation S105, the vehicle controller 300 may fetch previously registered information from a storage 700 and may provide the lamp driving device 500 with predetermined beam pattern information. In operation S106, the vehicle controller 300 may control the lamp driving device 500 such that an indoor or outdoor lamp of the vehicle outputs a predetermined beam pattern.

In operation S107, the vehicle controller 300 may identify a current state of the driver using biometric information of the driver, such as face recognition information or iris recognition information of the driver, by way of an image capture device 130. In operation S108, the vehicle controller 300 may control the lamp driving device 500 such that the indoor or outdoor lamp of the vehicle outputs a beam pattern to suit the current state of the driver. In this case, the vehicle controller 300 may control the indoor or outdoor lamp of the vehicle to output a beam pattern suitable for a current weather and a current time by way of a weather sensing device 170 and may control the lamp driving device 500 such that the indoor or outdoor lamp of the vehicle outputs a beam pattern using an option selected by the selection input device 190.

Meanwhile, when fingerprint information of the driver, which is input through the fingerprint sensing device 150, is unregistered driver information in operation S103, in operation S104, the vehicle controller 300 may determine whether the fingerprint information of the driver is driver information registered with a cloud server 900. When it is determined that there is driver information in the cloud server 900, the vehicle controller 300 may receive the driver information and may control the lamp driving device 500 to output a predetermined beam pattern based on the driver information. When the driver is not a registered user because the driver is not the owner of the vehicle, when there is no driver information in the cloud server 900, or when the driver does not agree with providing personal information, the vehicle controller 300 may perform iris or other facial recognition of the driver to obtain iris or other facial information and may change a beam pattern of the indoor or outdoor lamp of the vehicle according age information.

In addition, in operation S109, the vehicle controller 300 may identify a current state of the driver using biometric information of the driver. The results may store results learned using artificial intelligence (AI) to use a record where the indoor or outdoor lamp of the vehicle outputs a beam pattern to suit the current state of the driver. The record may include where the indoor or outdoor lamp of the vehicle outputs a beam pattern to suit the current state of the driver in real time by obtaining body information of the driver. The record may include where the indoor or outdoor lamp of the vehicle is controlled to output a beam pattern suitable for a current weather and a current time by way of the weather sensing device 170. The record may also include where a beam pattern of the indoor or outdoor lamp of the vehicle is directly selected by way of the selection input device 190 as big data.

Subsequently, when the driving of the vehicle is completed and when the driver alights from the vehicle in S110, in S111, the vehicle controller 300 may control the lamp driving device 500 to provide an escort lamp. The escort lamp may be turned on for a predetermined period of time or may stay lit until the driver moves a predetermined distance away from the vehicle.

According to the variable beam pattern lamp system for the driver and the method thereof, which are described above, the present technology may obtain identifiable personal information of the driver and may actively provide a beam pattern suitable for the driver, which may improve safety by distinguishing the registered user who uses his or her own vehicle from an unspecified unregistered user who does not want to open his or her personal information. Embodiments provide optimal beam patterns in which user information, such as an age, a gender, a fatigue level, or a mood state of the driver, is reflected, and may improve convenience u) by obtaining real-time information regarding location of the driver to a vehicle and controlling a beam pattern suitable for a situation.

Meanwhile, the method to control the variable beam pattern lamp according to operations S101 to S111 according to an embodiment of the inventive concepts may be programmed and stored in a storage medium to be readable by a computer.

The present technology may obtain identifiable personal information of the driver and may actively provide a beam pattern suitable for the driver, which may improve safety by distinguishing the registered user who uses his or her own vehicle from an unspecified unregistered user who does not want to open his or her personal information and providing an optimal beam pattern in which user information, such as an age, a gender, a fatigue level, or a mood state of the driver, is reflected, and may improve convenience by obtaining real-time information of the driver and controlling a beam pattern suitable for a situation.

In addition, various effects ascertained directly or indirectly through the inventive concepts may be provided.

Hereinabove, although the inventive concepts have been described with reference to exemplary embodiments and the accompanying drawings, the inventive concepts are not limited thereto, but may be variously modified and altered by those skilled in the art to which the inventive concepts pertain without departing from the spirit and scope of the inventive concepts recited in the following claims.

Therefore, the exemplary embodiments of the inventive concepts are provided to explain the spirit and scope of the inventive concepts, but not to limit them, so that the spirit and scope of the inventive concepts are not limited by the embodiments. The scope of the inventive concepts should be construed on the basis of the accompanying claims, and all the technical ideas within the scope equivalent to the claims should be included in the scope of the inventive concepts.

What is claimed is:

1. A variable beam pattern lamp system for a driver, the system comprising:
    an input device configured to receive personal information of the driver;
    a lamp driving device configured to drive an indoor or outdoor lamp of a vehicle to output a beam pattern matched to the driver, based on the personal information of the driver, the personal information being input through the input device; and
    a vehicle controller configured to determine whether the personal information is registered driver information or unregistered driver information when the personal information of the driver is input through the input device, and control the lamp driving device to drive the indoor or outdoor lamp of the vehicle to output beam patterns respectively corresponding to the personal information being the registered driver information or that the personal information being the unregistered driver information,
    wherein the beam pattern is matched to the driver by varying a color temperature of the light of the beam pattern to be in a short or long wavelength band to improve visibility of the driver.

2. The system of claim 1, wherein the input device includes:
    an image capture device configured to capture an image of a face of the driver; and
    a fingerprint sensing device configured to obtain fingerprint information of the driver.

3. The system of claim 2, wherein the input device further includes:
    a wireless communication device configured to receive information of a wireless device of the driver.

4. The system of claim 2, wherein the input device further includes:
    a weather sensing device configured to collect weather information.

5. The system of claim 2, wherein the input device further includes:
a selection input device configured to receive a selection of a beam pattern of the indoor or outdoor lamp of the vehicle from the driver.

6. The system of claim 1, wherein the beam pattern matched to the driver is differently provided according to an age, a gender, a fatigue level, or a mood state of the driver.

7. The system of claim 1, wherein the vehicle controller determines whether the personal information of the driver is driver information stored in an external server when the personal information of the driver being input through the input device is the unregistered driver information.

8. A method to control a variable beam pattern lamp for a driver, the method comprising:
receiving, by an input device, personal information of the driver;
determining, by a vehicle controller, whether the personal information is registered driver information or unregistered driver information, when the personal information of the driver is input through the input device, and controlling, by the vehicle controller, a lamp driving device to drive an indoor or outdoor lamp of a vehicle to output beam patterns respectively corresponding to that the personal information being the registered driver information and that the personal information is the unregistered driver information; and
driving, by the lamp driving device being controlled by the vehicle controller, the indoor or outdoor lamp of the vehicle to output a beam pattern matched to the driver,
wherein the driving of the indoor or outdoor lamp of the vehicle includes varying a color temperature of the light of the beam pattern to be in a short or long wavelength band to improve visibility of the driver.

9. The method of claim 8, wherein the receiving of the personal information of the driver includes:
capturing, by an image capture device, an image of a face of the driver; or
obtaining, by a fingerprint sensing device, fingerprint information of the driver.

10. The method of claim 9, wherein the receiving of the personal information of the driver further includes:
receiving, by a wireless communication device, information of a wireless device of the driver.

11. The method of claim 9, wherein the receiving of the personal information of the driver further includes:
collecting, by a weather sensing device, weather information.

12. The method of claim 9, wherein the receiving of the personal information of the driver further includes:
receiving, by a selection input device, a selection of a beam pattern of the indoor or outdoor lamp of the vehicle.

13. The method of claim 8, wherein the determining whether the personal information is the registered driver information or the unregistered driver information includes:
determining, by the vehicle controller, whether the personal information of the driver is driver information stored in an external server when the personal information of the driver being input through the input device is the unregistered driver information.

14. The method of claim 8, wherein the driving of the indoor or outdoor lamp of the vehicle includes:
differently providing the beam pattern matched to the driver depending on an age, a gender, a fatigue level, or a mood state of the driver.

15. A computer-readable storage medium storing a program to execute the method to control the variable beam pattern lamp for a driver of claim 8.

* * * * *